A. J. BARTZ.
STALK CHOPPER.
APPLICATION FILED OCT. 5, 1917.
1,329,220.
Patented Jan. 27, 1920.
3 SHEETS—SHEET 3.
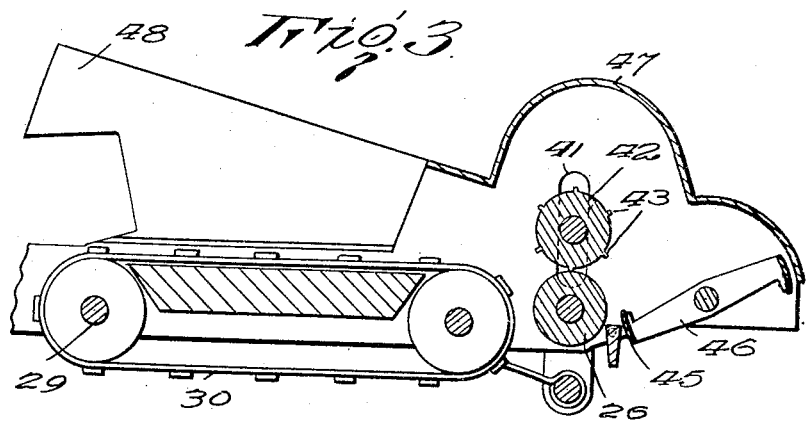
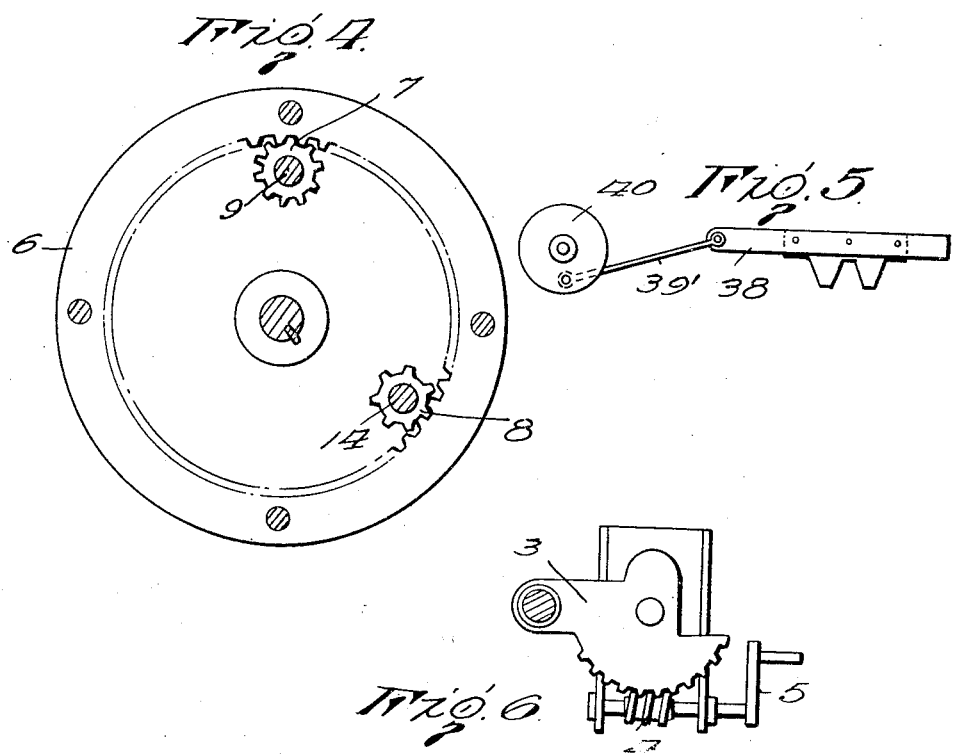
Adolph J. Bartz
Inventor
By Geo. Kimmel
Attorney

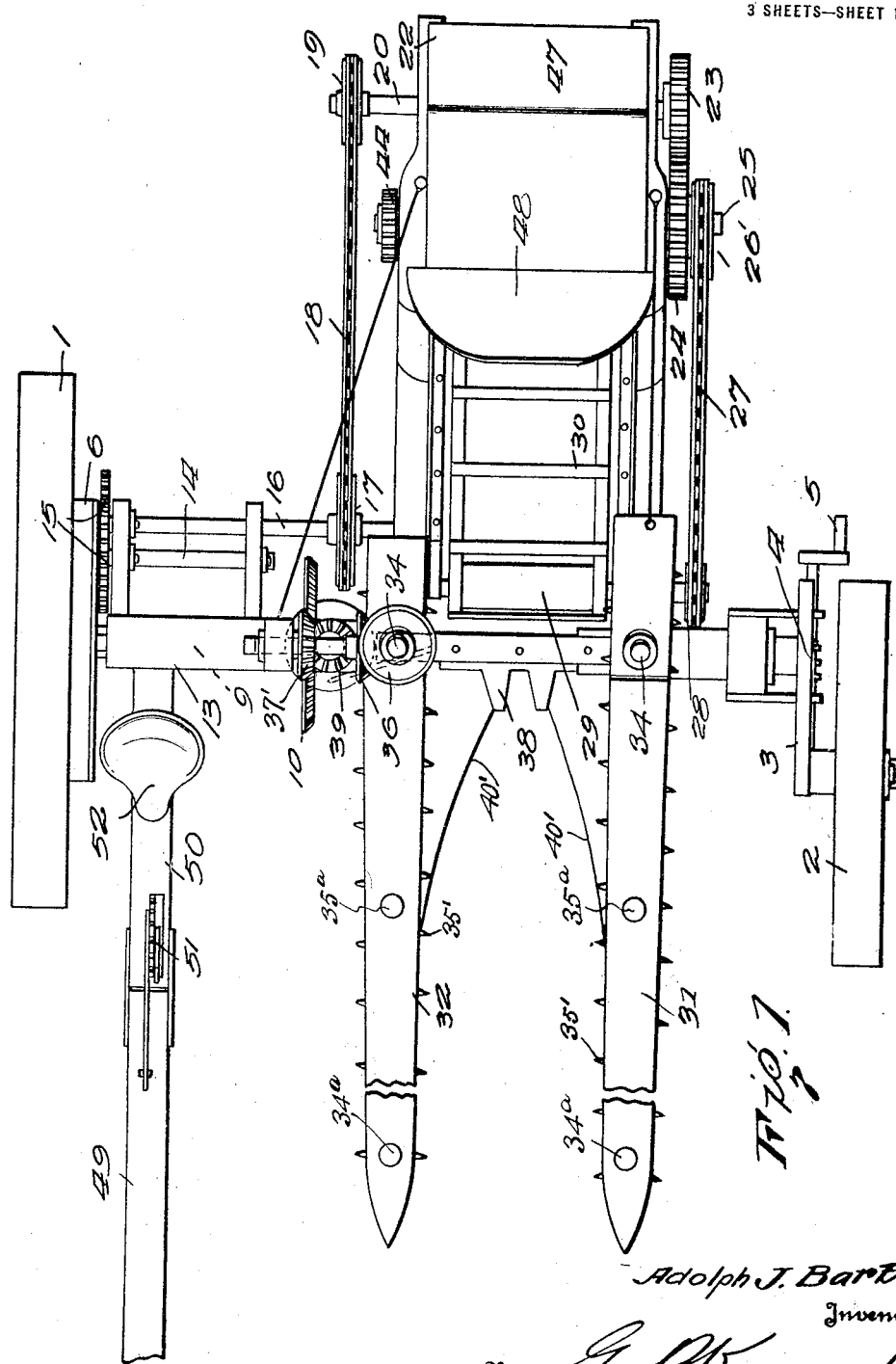

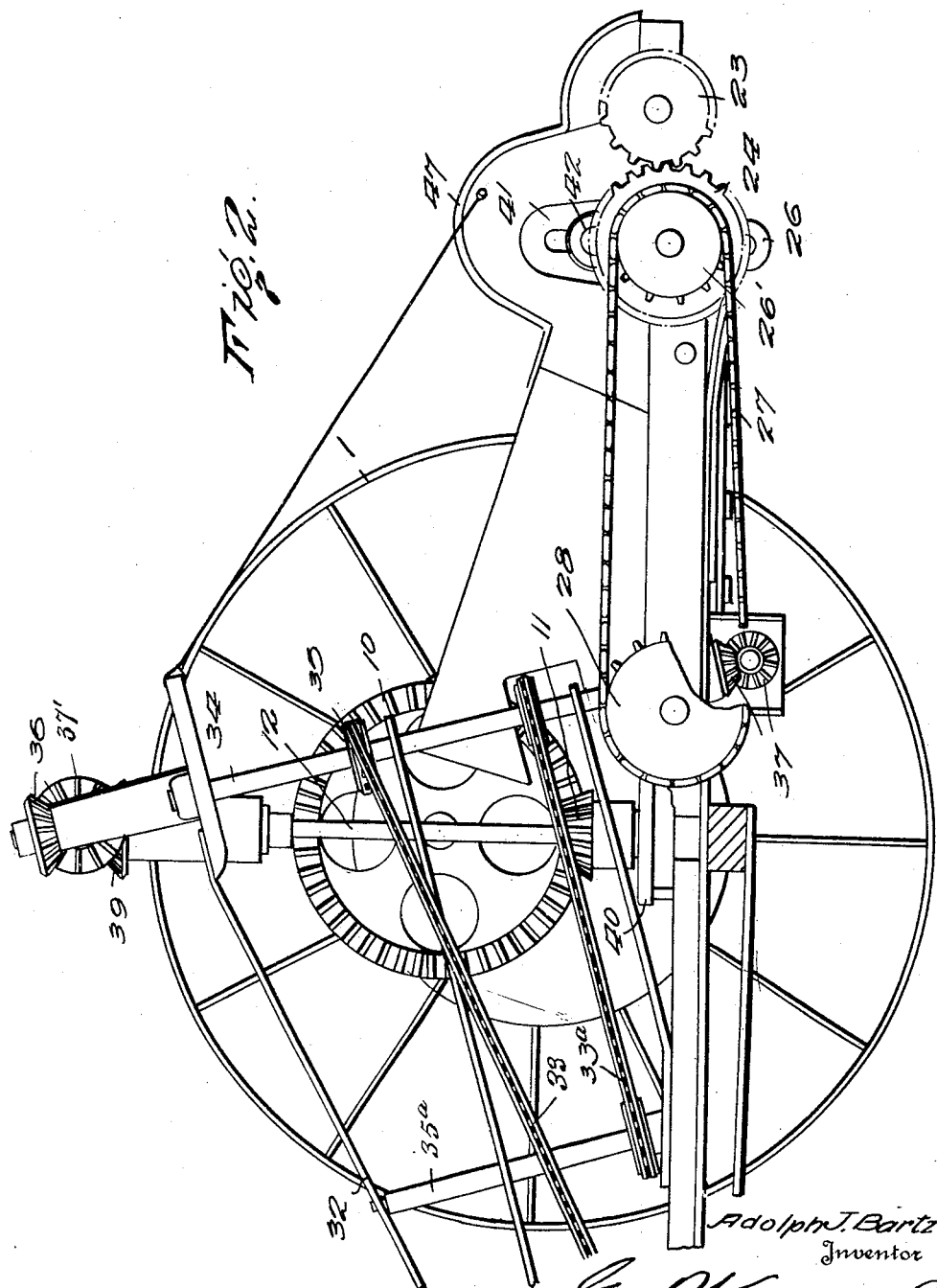

UNITED STATES PATENT OFFICE.

ADOLPH J. BARTZ, OF CRANDALL, TEXAS.

STALK-CHOPPER.

1,329,220.　　　　　Specification of Letters Patent.　　Patented Jan. 27, 1920.

Application filed October 5, 1917. Serial No. 194,894.

*To all whom it may concern:*

Be it known that I, ADOLPH J. BARTZ, a citizen of the United States, and resident of Crandall, in the county of Kaufman and State of Texas, have invented certain new and useful Improvements in Stalk-Choppers, of which the following is a specification.

This invention relates to harvesting machines and has more especial reference to an improved stalk cutting machine.

The invention has for its principal object to provide a stalk cutting machine whereby corn stalks can be cut subsequent to the stripping of the ears therefrom, cut into small pieces and discharged onto the field for fertilizing the same, thereby effecting a material saving of labor and time for the user.

Another object of the invention is to provide means for crushing the stalks previous to the chopping of the same, thus killing worms or other animal life which may be therein.

Other independent objects are to provide features of construction of portions of the machine which tend toward the attainment of the above aims irrespective of the relation in which they are used.

Other objects will be in part obvious and in part pointed out hereinafter.

The invention accordingly consists in the features of construction, combinations of elements and arrangement of parts which will be exemplified in the construction hereinafter set forth and the scope of the application of which will be indicated in the following claims.

In the accompanying drawings, wherein is shown one of various possible embodiments of my invention;

Figure 1 is a top plan of the improved stalk cutting machine;

Fig. 2 is a fragmentary vertical section therethrough;

Fig. 3 is a vertical longitudinal section through the stalk conveying and chopping means;

Fig. 4 is a detail partly in section of the gearing for transmitting motion to the various active parts of the machine;

Fig. 5 is a detail in top plan of the stalk cutter; and

Fig. 6 is a detail of the means for adjusting one side of the machine vertically.

Similar characters of reference refer to similar parts throughout the several views of the drawings.

Having more particular reference to the drawings, the machine includes a wheeled frame, the wheels 1 and 2 of which are mounted upon suitable axles, it being noted in this connection, that the wheel 2 is mounted upon an axle carried on a supporting arm 3, which supporting arm is in turn pivotally mounted on the machine frame and is provided with a segmental gear, the teeth of which are engaged by a worm gear 4 operated through the medium of a crank handle 5. Thus, by turning the worm gear 4, pivotal movement of the supporting arm will be caused due to the engagement of the segmental gear with the said worm and as a consequence, one side of the machine frame may be adjusted vertically to the desired extent.

An internal gear 6 is carried by the wheel 1 and meshes with pinions 7 and 8, the pinion 7 being carried upon a shaft 9, the opposite extremity of which is provided with a beveled gear 10, the said gear 10 in turn, meshing with a similar gear 11 carried upon a vertically disposed shaft 12 journaled in bearings upon an upright 13.

The pinion 8 is carried upon one end of a stub shaft 14 journaled in bearings upon the upright 13, which shaft is in turn connected through the medium of gearing 15 to a power transmitting shaft 16 extending transversely of the machine frame carrying a sprocket wheel 17 thereon, about which a sprocket chain 18 is passed, the said chain also engaging a sprocket wheel 19 arranged upon one end of a shaft 20 journaled in bearings upon an endless conveyer supporting frame 22, which shaft carries rotary chopping knives hereinafter described. A gear 23 is mounted on the remaining end of the shaft 20, and meshes with a gear 24 carried upon a second shaft 25 carrying a crushing roll 26. Adjacent the gear 24 there is mounted a sprocket wheel 26' receiving one end of a sprocket chain 27 thereabout, the remaining end of the sprocket chain passing forwardly about a sprocket wheel 28 mounted upon one extremity of a shaft carrying a pulley 29, over which an endless conveyer 30 passes, it of course being understood in this connection, that a suitable idler is journaled in bearings in the belt supporting frame for receiving the remaining end of the conveyer thereabout.

Runners 31 and 32 are carried upon the forward portion of the machine frame and extend longitudinally thereof. These runners, as shown in the Fig. 1, are of conventional construction and are designed to guide the stalks to be cut by the machine into engagement with the cutting means herein described. Each runner is provided with a relatively long sprocket chain 33 extended over a driving sprocket wheel 35 mounted on a shaft 34 and over a suitable sprocket wheel mounted on a short shaft 34$^a$ mounted in the terminal of the runner. Each runner is also provided with a relatively short chain 33$^a$ which extends over sprocket wheels on the shaft 34 and on an intermediate shaft 35$^a$ journaled in the runner.

Suitable arms 35′ are arranged upon the chains 33 serving as means for moving the stalks into engagement with the cutting means. To transmit rotary motion to the shafts 34 suitable beveled gearing generally indicated by the numeral 36 is provided for one of the shafts, while other beveled gearing indicated by the numeral 37 is provided for the remaining shaft, it being noted in this connection, that power is stepped to the gearing 36 and 37 from the wheel 1 by gearing 37″.

Arranged between the rear ends of the runners 31 and 32 is a reciprocating stalk cutter 38 which is engaged by a pitman 39 pivotally connected to a disk 40 mounted on the lower end of the vertical shaft 12. The opposed guide portions 40′ at the inner ends of the runners act in effect as stationary teeth and coact with the teeth of the reciprocating cutter insuring an effective cutting action, as is apparent.

Slotted brackets 41 are rigidly supported adjacent the opposite ends of the crushing roll 26 and serve as means for movably supporting a second crushing roll 42 provided with longitudinally disposed ribs 43. The rolls 26 and 42 are interconnected by means of suitable gearing 44.

Positioned rearwardly of the crushing rolls 26 and 42 is a rotary chopper comprising blades 45 carried upon arms 46 mounted on the shaft 20, the said blades being so arranged as to engage and chop such stalks as pass thereon from the crushing rolls 26 and 42.

About the crushing rolls and the rotary chopper there is arranged a hood or casing 47, while forwardly of the same is an inclined deflector 48, this deflector serving as means for guiding the cut stalks into engagement with the crushing rolls.

A draft pole 49 is pivotally connected with a beam 50 carried by the machine frame and has movement thereof controlled by a lever 51.

A seat 52 is mounted upon a suitable spring standard secured to the beam 50 and serves for an obvious purpose.

In operation, the harvesting machine is pulled over a field bearing the corn stalks and the runners 31 and 32 engaged with the various rows of the same, directing the stalks into engagement with the reciprocating cutter 38, whereby they will be severed and dropped onto the endless conveyer 30. By way of the conveyer 30, they will be delivered to the crushing rolls 26 and 42 and crushed in order that any animal life existing therein will be killed. From the rolls 26 and 42, the crushed stalks are discharged onto the rotary chopper, whereupon they are cut into small pieces and distributed onto the surface of the field for fertilizing the same.

Manifestly, the construction shown is capable of considerable modification, and such modification as is within the scope of my claims, I consider within the spirit of my invention.

I claim:

1. In a stalk cutting machine, spaced runners, a reciprocating cutter arranged between said runners, an endless conveyer communicating with the reciprocating cutter, stalk crushing rolls adjacent the rear end of the conveyer, rotary chopping means communicating with the crushing rolls and a hood surrounding said rolls and chopping means.

2. In a stalk cutting machine, in combination, spaced runners having opposed guide portions at their inner ends, a reciprocating cutter arranged between said runners and coacting with the guide portions thereof, conveying means extending rearwardly from the cutter, stalk crushing means adjacent the rear end of the conveying means, chopping means communicating with the crushing means, and a hood surrounding said crushing and chopping means.

In testimony whereof, I affix my signature hereto.

ADOLPH J. BARTZ.